Figure 1:
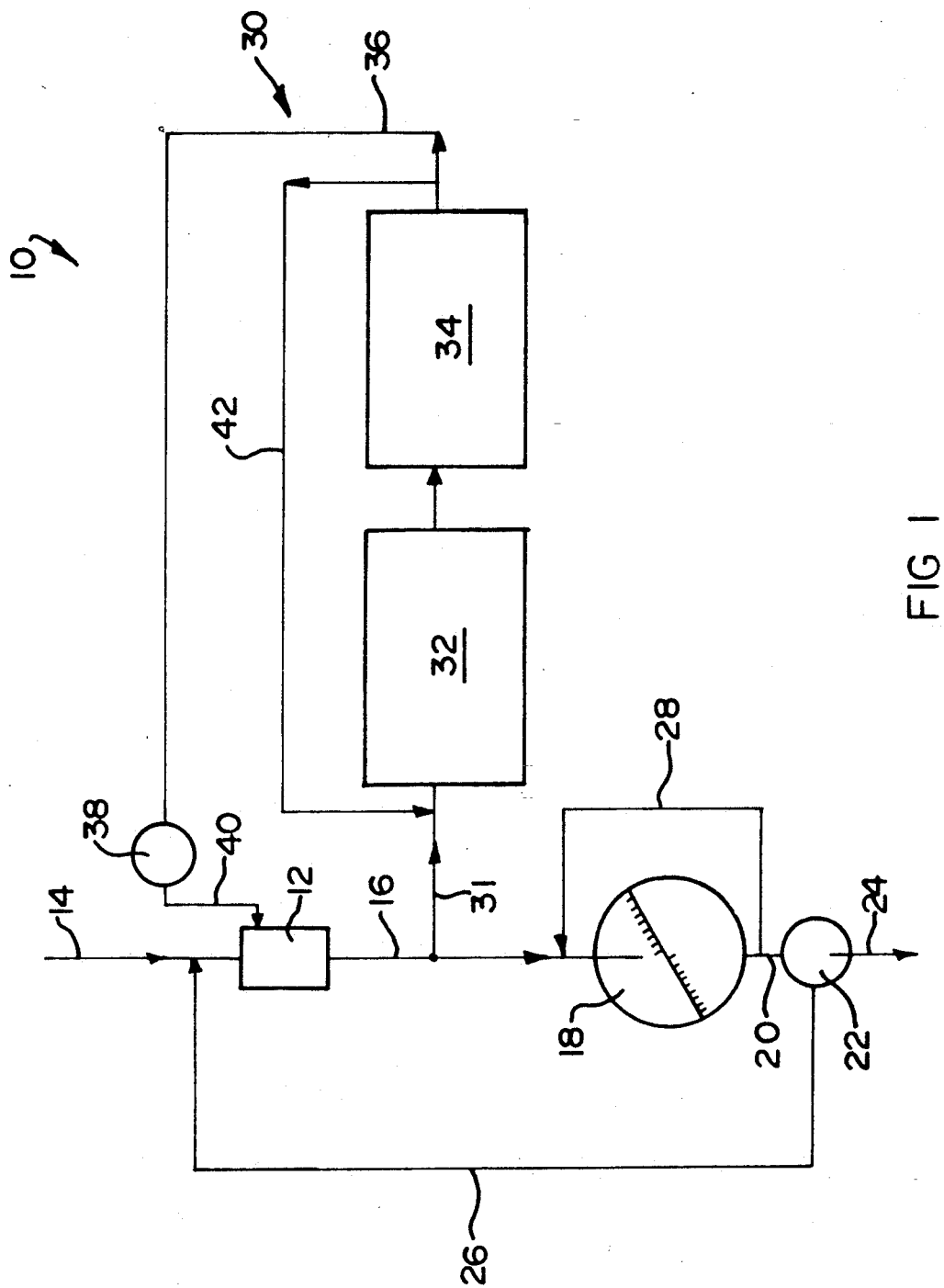

United States Patent [19]

Meiring

[11] Patent Number: 5,246,585
[45] Date of Patent: Sep. 21, 1993

[54] TREATMENT OF WASTEWATER

[75] Inventor: Pieter G. J. Meiring, Pretoria, South Africa

[73] Assignee: Pieter Gerhard Jacobus Meiring & Water Research Commossion, Pretoria, South Africa

[21] Appl. No.: 987,653

[22] Filed: Dec. 9, 1992

[30] Foreign Application Priority Data

Dec. 11, 1991 [ZA] South Africa ............... 91/9768
Mar. 31, 1992 [ZA] South Africa ............... 92/2341

[51] Int. Cl.$^5$ ............................................. C02F 3/30
[52] U.S. Cl. ............................... 210/605; 210/621; 210/625; 210/630; 210/903
[58] Field of Search ............... 210/605, 617, 621–626, 210/629, 630, 903

[56] References Cited

U.S. PATENT DOCUMENTS

| | | | |
|---|---|---|---|
| Re. 32,429 | 6/1987 | Spector | 210/605 |
| 4,179,374 | 12/1979 | Savage et al. | 210/903 |
| 4,407,717 | 10/1983 | Teletzke et al. | 210/621 |
| 4,487,697 | 12/1984 | Böhnke et al. | 210/605 |
| 4,488,968 | 12/1984 | Hong et al. | 210/605 |
| 4,999,111 | 3/1991 | Williamson | 210/605 |
| 5,076,929 | 12/1991 | Fuchs et al. | 210/605 |

Primary Examiner—Thomas Wyse
Attorney, Agent, or Firm—Wood, Herron & Evans

[57] ABSTRACT

A wastewater treatment process 100 comprises passing wastewater through an anaerobic reaction zone 12 so that organic matter in the wastewater is subjected to anaerobic biological degradation. Wastewater from the anaerobic reaction zone is passed through an aerobic reaction zone 18 in which organic matter in the wastewater is subjected to aerobic biochemical breakdown. A wastewater side stream 30 is withdrawn downstream of the anaerobic reaction zone and upstream of the aerobic reaction zone, and passed through a facultative oxidation zone 32, 33, 34 wherein organic matter therein is subjected to aerobic biochemical breakdown. At least a portion of the side stream is passed directly to the aerobic reaction zone. Optionally, a portion of the side stream can be returned to the anaerobic reaction zone.

14 Claims, 2 Drawing Sheets

TREATMENT OF WASTEWATER

This invention relates to the treatment of wastewater. It relates in particular to a wastewater treatment process.

According to a first aspect of the invention, there is provided a wastewater treatment process, which comprises passing wastewater through an anaerobic reaction zone so that organic matter in the wastewater is subjected to anaerobic biological degradation;

passing wastewater from the anaerobic reaction zone through an aerobic reaction zone in which organic matter in the wastewater is subjected to aerobic biochemical breakdown;

withdrawing a wastewater side stream downstream of the anaerobic reaction zone and upstream of the aerobic reaction zone;

passing the side stream through a facultative oxidation zone wherein organic matter therein is subjected to aerobic biochemical breakdown; and returning at least a portion of the side stream to the anaerobic reaction zone.

The aerobic reaction zone may be provided by a biological trickling filter. However, if desired, any other suitable aerobic reaction zone-providing means may instead be provided, such as an activated sludge reactor, a biodisc facility, or the like.

The anaerobic reaction zone may be provided by at least one anaerobic reactor. For example, two or more anaerobic reactors arranged in series can be utilized. Each anaerobic reactor may be in the form of a lagoon. In the anaerobic reaction zone, the biological oxygen demand of the wastewater is reduced substantially by biological degradation, as well as by sedimentation. Complex organic compounds in the wastewater are also rendered more amenable to further biochemical breakdown in the subsequent aerobic reaction zone, e.g. by being hydrolyzed and fermented to short chain fatty acids.

By means of the side stream, the rate of which may be variable, the organic load or biological oxygen demand on the aerobic zone can be reduced substantially. The maximum rate of the side stream is determined by the requirement that anaerobic conditions must be maintained, at least in the lower levels of the anaerobic reactor. The facultative oxidation zone may be provided by at least one pond. However, a number of ponds arranged in series can be beneficial.

The side stream may also pass through a nitrification zone, downstream of the facultative oxidation zone, for nitrifying the side stream at least partially, with denitrification thereof thereafter taking place in the anaerobic reaction zone.

The process may include passing effluent wastewater from the aerobic reaction zone through a clarification zone where biological sludge in suspension is separated from the treated wastewater. The underflow from the clarification zone may be recycled as a sludge stream to the anaerobic reaction zone.

If desired, a recycle stream may be withdrawn from the aerobic reaction zone effluent upstream of the clarification zone, and recycled back to the wastewater stream entering the aerobic reaction zone to obtain some denitrification thereof and a concomittant recovery of alkalinity.

If also desired, a portion of the side stream from the facultative oxidation pond may be recycled from upstream of the anaerobic reaction zone, back to the side stream upstream of the pond, or even directly into the pond. Where a series of such ponds are used, the portion of wastewater may be recycled from the last of the series of ponds, but before the side stream passes to the anaerobic zone, to the side stream ahead of the first such pond, or into the first pond.

The process may include passing a portion of the side stream directly to the aerobic reaction zone, with only a portion thereof thus being returned to the anaerobic reaction zone.

The portion of the side stream which is passed directly to the aerobic reaction zone, may be withdrawn at a point after the side stream has been subjected to at least some biological oxidation in the facultative oxidation pond. Thus, it may be withdrawn from the side stream downstream of the facultative oxidation pond. Where a number of such ponds in series are provided, the withdrawal may be effected from downstream of the first of the ponds. It has been found that by utilizing such withdrawal and addition thereof to the aerobic reaction zone without recycle thereof through the anaerobic zone, a substantial amount of colloidal matter present therein, including algae, can be absorbed or removed in the aerobic zone by means of heterotrophic organisms in the aerobic zone, thereby resulting in particularly effective operation of the aerobic reaction zone.

The portion of the side stream which passes directly to the aerobic reaction zone may, to enhance denitrification, if required, enter the wastewater stream from the anaerobic reaction zone downstream of the point at which the side stream is withdrawn therefrom.

The wastewater from the anaerobic reaction zone may, also to enhance denitrification, pass through a facultative oxidation zone prior to entering the aerobic reaction zone, with the side stream being withdrawn downstream of this facultative oxidation zone.

According to a second aspect of the invention, there is provided a wastewater treatment process, which comprises passing wastewater through an anaerobic reaction zone so that organic matter in the wastewater is subjected to anaerobic biological degradation;

passing wastewater from the anaerobic reaction zone through an aerobic reaction zone in which organic matter in the wastewater is subjected to aerobic biochemical breakdown;

withdrawing a wastewater side stream downstream of the anaerobic reaction zone and upstream of the aerobic reaction zone;

passing the side stream through a facultative oxidation zone wherein organic matter therein is subjected to aerobic biochemical breakdown;

passing at least a portion of the side stream directly to the aerobic reaction zone; and optionally, returning a portion of the side stream to the anaerobic reaction zone.

Thus, in one embodiment of this aspect of the invention, a portion of the side stream can be returned to the anaerobic reaction zone with the maximum rate of this portion then being determined by the requirement that anaerobic conditions must be maintained at least in the lower levels of the anaerobic reaction zone. However, in another embodiment, no portion of the side stream is returned to the anaerobic reaction zone.

According to a third aspect of the invention, there is provided a wastewater treatment process which comprises passing wastewater through an anaerobic reaction zone so that organic matter in the wastewater is subjected to anaerobic biological degradation;

passing the wastewater from the anaerobic reaction zone through a first facultative oxidation zone wherein organic matter therein is partially subjected to aerobic biochemical breakdown;

passing the wastewater from the first facultative oxidation zone to an aerobic reaction zone in which the organic matter present therein is subjected to further aerobic biochemical breakdown;

withdrawing a wastewater side stream downstream of the first facultative oxidation zone and upstream of the aerobic reaction zone;

passing the side stream through a second facultative oxidation zone; and returning at least a portion of the side stream to the anaerobic reaction zone.

The anaerobic reaction zone, aerobic reaction zone, side stream composition and routing, facultative oxidation zones, etc may be as hereinbefore described.

The invention will now be described by way of example with reference to the accompanying drawings.

Figure 2:
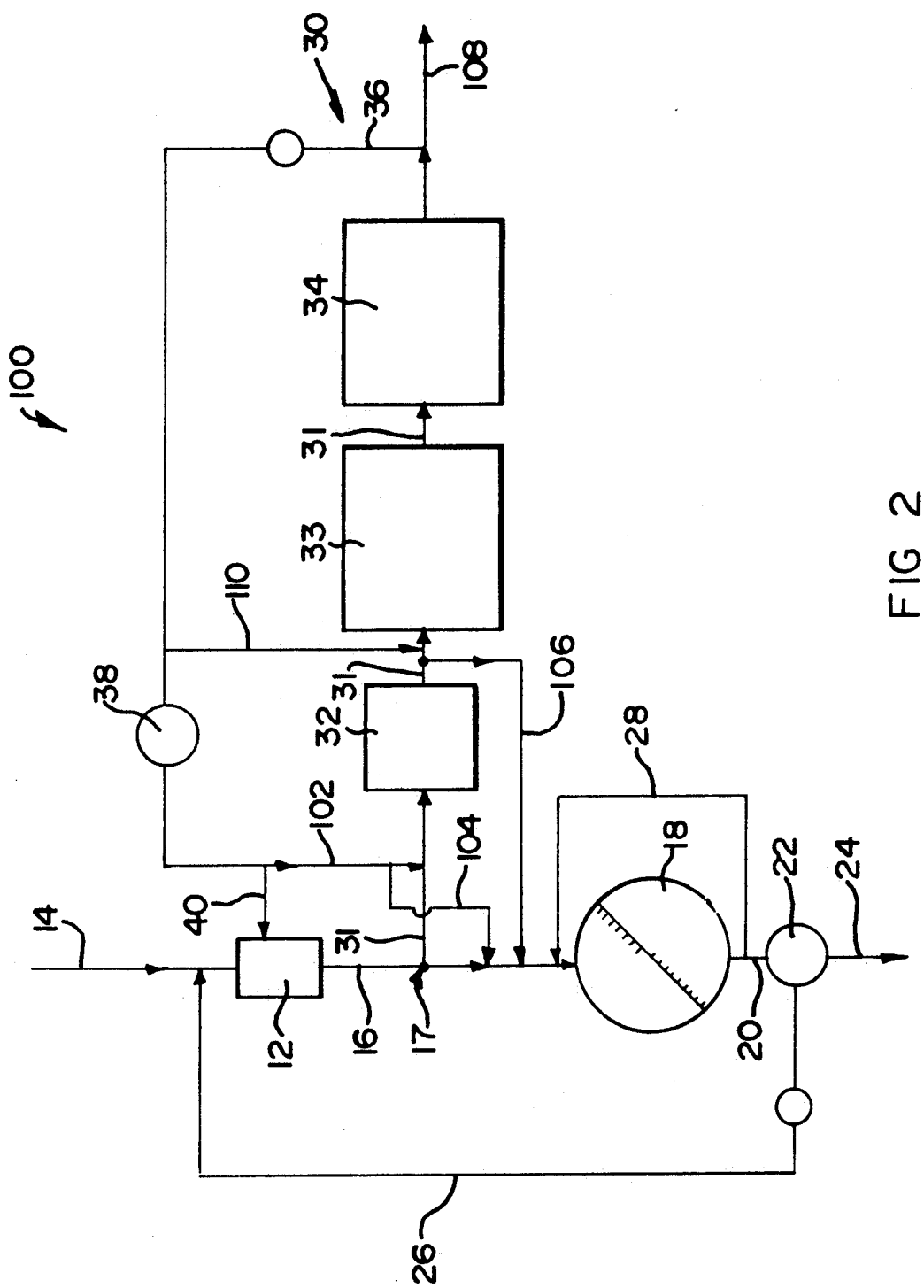

In the drawings,

FIG. 1 shows a simplified flow diagram of a wastewater treatment process according to one embodiment of the invention; and FIG. 2 shows a simplified flow diagram of a wastewater treatment process according to another embodiment of the invention.

Referring to FIG. 1, reference numeral 10 generally indicates a water treatment process according to one embodiment of the invention.

The process 10 includes an anaerobic reactor 12, which may, for example, be in the form of a lagoon, with a wastewater flow line 14 leading into the lagoon 12 and discharging well below the liquid surface of the lagoon. The lagoon can be of elongate form with a laterally extending barrier, whose upper edge is located below the surface of the liquid, splitting the lagoon into two zones. The high intensity first zone in proximity to the discharge of the flow line 14 constitutes a first fermentation zone approaching an upflow anaerobic sludge blanket regime, while the second zone constitutes a secondary fermentation zone to achieve more advanced biological breakdown. Instead, the reactor 12 can be in the form of an upflow reaction vessel, or even a fixed bed growth system or a fluidized bed attached growth system, in which case an upstream sedimentation tank (not shown) for removal of settable solids is required. The lagoon can be of substantial volume, and can have a geometrical form as desired. Typically, it can have a design load of about 0,7 kg COD/m$^3$.

An anaerobic reactor effluent wastewater flow line 16 leads from the lagoon 12 to a biological trickling filter 18, which provides an aerobic reaction zone. An aerobic reaction zone effluent flow line 20 leads from the trickling filter 18 to a clarifier 22, with a clarifier effluent withdrawal flow line 24 leading from the clarifier 22. A waste biological sludge recycle flow line 26 leads from the clarifier 22 back to the flow line 14, while an aerobic reaction zone effluent recycle flow line 28 leads from the flow line 20 back to the flow line 16.

The process 10 also includes a wastewater side stream loop 30. The loop 30 comprises a flow line 31 leading from the flow line 16, to a primary facultative oxidation pond 32 arranged in series with a secondary facultative oxidation pond 34. A plurality of the secondary ponds 34 arranged in series can be provided, with the number of secondary ponds being optional. A flow line 36 leads from the pond 34 to a nitrification reactor 38, with a flow line 40 leading from the reactor 38 back to the anaerobic reactor 12. The flow lines 31, 36 and 40 hence make up the loop 30. A side stream flow line 42 leads from the flow line 36, upstream of the nitrification reactor 38, back to the flow line 31. The nitrification reactor 38 is optional, and can be omitted if desired.

In use, wastewater to be treated, e.g. raw sewage and/or industrial wastewater of suitable composition, enters the anaerobic pond 12 along the flow line 14, preferably after having been passed through a screen (not shown) to remove rags, plastics material, floating debris, etc, as well as through a channel for removal of sand and grit. In the lagoon 12, organic matter or biochemical oxygen demand ('BOD') in the wastewater is substantially reduced by both sedimentation and biological degradation. In particular, in the lagoon 12, complex organic compounds present in the wastewater are solubilized and chemically degraded, thereby not only reducing the organic load but also rendering the compounds more amenable to further biochemical breakdown, as hereinbefore described. Due to the slow stabilized solids build-up, desludging of the lagoon 12 is only required infrequently.

Effluent wastewater from the reactor 12 passes along the flow line 16, into the trickling filter 18. In the filter 18, wastewater trickles over bacterial slime growing on the filter media, e.g. stone. Organic matter diffuses towards the bacteria, while oxygen diffuses into the slime layer from air moving through the interstices between the filter media. The bacteria grow in the presence of dissolved oxygen, breaking down the organic matter into simple components such as carbon dioxide and water. Thus, removal of organic matter leads to bacterial growth, and excess bacteria slough off the filter media to be removed in the humus tank. Normal limitations of trickling filters are the rate of diffusion of complex organic compounds into the slime layer, and slow degradation of these compounds into simpler carbon and ammonia compounds. These limitations are at least partly alleviated by the upstream treatment in the lagoon 12 and the ponds 32, 34. For example, the much simpler and more readily degradable organic compounds formed in the lagoon 12 diffuse much more readily into the slime layers in the filter 18 and carbonaceous oxidation is accelerated. Subsequent conversion of ammonia compounds to nitrates is likewise affected profitably. Instead of the trickling filter 18, any other suitable aerobic reaction system such as an activated sludge reactor or a biodisc, can be provided.

A substantial, but variable, portion of the wastewater leaving the pond 12, is routed as a side stream along the flow line 31, to the facultative oxidation ponds 32, 34. In this fashion, the organic load applied to the trickling filter 18 is reduced markedly. The maximum rate of the side stream treated via the flow lines 31, 36, 40 is, as hereinbefore set out, set by the requirement that the lagoon 12 must remain anaerobic for all but its surface layer.

Useful biological degradation of the residual organic load still present in the wastewater effluent from the lagoon 12, can thus be effected in the ponds 32, 34; however, photosynthetic production of new algal cell matter in the ponds 32, 34, i.e. the creation of new pollutants, takes place in the ponds 32, 34. This synthesized organic load in the form of algae can, however, be handled in the process 10, since it is recycled back to the lagoon 12. Some of the algae are subjected to anaerobic degradation in the lagoon, with the algal remains and the rest of the algae then being largely removed in the trickling filter 18. A further advantage of treating wastewater effluent from the lagoon 12 in the loop 30 is that anaerobiasis in the lagoon 12 is thereby sufficiently controlled to limit malodorous conditions from arising in the lagoon 12.

By means of the nitrification reactor or column 38 which is optional, a nitrification/denitrification arrangement is achievable. By means of this arrangement, at least partial nitrification of ammonia in the effluent from the ponds 32, 34 is achieved, which is followed by denitrification in the lagoon 12. This has the primary advantage that unacceptably high ammonia nitrogen levels, as compared to greatly reduced organic carbon levels, in the effluent from the ponds 32, 34, which would otherwise partially return to the ponds 32, 34 along the loop 30, and partially be applied onto the trickling filter, can be controlled, and the loss of alkalinity of the final effluent withdrawn along the flow line 24 is limited. It has a secondary advantage that nitrates being thus formed assist in controlling malodorous conditions in the lagoon 12.

In the clarifier 22, biological sludge metabolized in the aerobic reaction zone is separated from the wastewater, with the sludge having a higher organic load than the final effluent withdrawn along the flow line 24. This sludge, suspended in a nitrified filter effluent, can be recycled along the flow line 26, as hereinbefore described, to assist in preventing odour formation in the lagoon 12, due to the nitrates therein. This also results in diluting nitrogen levels in wastewater passing along flow line 16. In this way, the waste biological sludge is retained until such time as a well-stabilized sludge can be extracted on a regular basis to avoid excessive build-up, thereby allowing prolonged use, or if the lagoon is provided in duplicate, one can be emptied to render that lagoon available for a next cycle of use, where applicable.

The use of the recycle flow lines 26, 28 and 42, impart further advantages to the process 10, as described herein.

If static water sprays are used in place of conventional rotating arms in the trickling filter 18, then no further moving mechanical parts are required in the process 10 other than the pumps required for wastewater recirculation.

The flow line 26 thus recycles waste biological sludge settled out in the clarifier 22 to the anaerobic reaction zone 12.

The recycle along the flow line 42 is optional, and, when present, contributes to optimizing operation of the ponds 32, 34.

Likewise, the recycle along the flow line 28 is optional and, when present, is used to obtain a measure of denitrification and recovery of alkalinity, if necessary.

Typically, the effluent withdrawn along the flow line 24 will have a COD $\leq$ 70 mg/l; total nitrogen $\leq$ 15 mg/l, and Coliform counts $\leq$ 100000/ml. Typical analyses for wastewater treated in the process 10 are as follows:

| | Effluent from lagoon 12 | Feed to trickling filter 18 | Effluent withdrawn along flow line 24 | Effluent from pond 34 |
|---|---|---|---|---|
| Alkalinity | 204 | 164 | 24 | 220 |
| COD | 352 | 148 | 54 | 167 |
| Filtered COD | 149 | 99 | 60 | 120 |
| Kjeldahl-N | 47 | 27 | 8 | 33 |
| $NH_3$-N | 25 | 19 | 3 | 25 |
| $NO_3$-N | — | 4 | 12 | 2 |
| LAS | 6 | 3 | 1 | 2 |
| Chlorophyll ($\mu$g/l) | 50 | 100 | 20 | 800 |

If desired, a tertiary treatment, such as a reedbed or wetland (not shown) to which the flow line 24 leads, can also be provided.

Referring to FIG. 2, reference numeral 100 generally indicates a water treatment process according to another embodiment of the invention.

Parts of the process 100 which are the same or similar to those of the process 10 are indicated with the same reference numerals.

The process 100 also includes a wastewater loop 30 comprising the flow line 31 leading from the flow line 16 at a zone or point 17, to a primary facultative oxidation pond 32 arranged in series with secondary facultative oxidation ponds 33, 34. A greater number of the secondary ponds 34 arranged in series can be provided, with the number of secondary ponds being optional, as hereinbefore described. A recycle flow line 102 leads from the flow line 36, downstream of the nitrification reactor 38, back to the flow line 31. The nitrification reactor 38 is optional, and can be omitted if desired.

A flow line 104 leads from the recycle flow line 102 to the flow line 16, downstream of the zone or point 17.

A flow line 106 leads from the flow line 31 between the ponds 32, 33 to the flow line 16 downstream of the zone 17.

An optional/additional discharge line 108, leading from the flow line 36, is provided.

If desired, an optional interpond recirculation loop can be provided by means of a flow line 110 leading from the flow line 36, upstream of the nitrification reactor 38, to the flow line 31 between the ponds 32, 33. This loop can be used to increase the load treated in the ponds 33, 34.

The recycle along the flow line 102 contributes to optimizing operation of the ponds 32, 34.

By means of the flow lines 102, 104 and/or 106 wastewater which has been at least partially subjected to facultative oxidation can be routed or passed directly from the side stream loop 30 to the biological filter 18. If desired, the entire flow of wastewater passing from the anaerobic reactor 12 can pass along the flow line 31, through the oxidation pond 32, and then to the biological filter 18 along the flow line 106, i.e. none of the wastewater from the reactor 12 then passes directly to the filter 18.

The applicants have found that, provided sufficient heterotrophic nourishment is available to the biomass in the filter 18, heterotrophic (as opposed to autotrophic) organisms in the filter 18 colonize the slime layer in the upper zones of the filter 18. These organisms have the ability to absorb a substantial amount of colloidal matter, including algae, for subsequent aerobic degradation in the filter 18. Thus, a portion of the recycle stream passing along the side stream loop 30 can, after being subjected to at least some facultative oxidation, be routed directly by means of the flow lines 104 or 106 to the filter 18.

The applicants believe that with the processes 10, 100 in which the various process stages or steps are combined to provide synergistic performance, economic and efficient treatment of wastewater such as domestic sewage and industrial wastewater of an organic nature can be effected, since capital requirements for the processes 10, 100 are relatively low, relatively little and only simple operational skills are required, and energy requirements are low. The processes 10, 100 also have the following advantages:

low operating costs;

no primary sedimentation tanks, sludge digesters, or sludge drying beds are required if duplicate anaerobic reactors are provided;

flexibility in accepting and attenuating peak diurnal and wet weather wastewater loads;

substantial reduction of biochemical organic load in wastewater treated in the anaerobic/aerobic food/micro-organism pond reactor 12 is achieved, thereby reducing markedly the load applied to the secondary aerobic reaction zone 18, resulting in a concomitant reduction in capacity and capital cost in the secondary facility;

an effluent with low organic carbon content (COD $\leq 75$ mg/l) and low total nitrogen ('Tot N $\leq 15$ mg/l) can be produced consistently in areas with a cold, temperate or warmer climate;

an existing wastewater treatment installation can be upgraded stagewise to arrive at the process 10 or 100, or the process 10 or 100 can be constructed in stagewise fashion, if desired;

the processes 10, 100 are aesthetically acceptable, and even an environmental asset since it creates an attractive habitat for water birds;

the processes 10, 100 can be utilized even in rural areas where electricity is not available as a result of the few moving parts, since the recirculation pumps can then be internal combustion engine driven;

where electricity is available, power failures will not have serious detrimental effects on the performance of the process since it can operate without the recycles for periods of time, if necessary.

I claim:

1. A wastewater treatment process, which comprises
passing wastewater through an anaerobic reaction zone so that organic matter in the wastewater is subjected to anaerobic biological degradation;
passing wastewater from the anaerobic reaction zone through an aerobic reaction zone in which organic matter in the wastewater is subjected to aerobic biochemical breakdown;
withdrawing a wastewater side stream downstream of the anaerobic reaction zone and upstream of the aerobic reaction zone;
passing the side stream through a facultative oxidation zone wherein organic matter therein is subjected to aerobic biochemical breakdown; and
returning at least a portion of the side stream to the anaerobic reaction zone.

2. A wastewater treatment process according to claim 1, wherein the aerobic reaction zone is provided by a biological trickling filter.

3. A wastewater treatment process according to claim 1 wherein the anaerobic reaction zone is provided by an anaerobic lagoon.

4. A wastewater treatment process according to claim 1 wherein the facultative oxidation zone is provided by at least one pond.

5. A wastewater treatment process according to claim 4, wherein the side stream also passes through a nitrification zone, downstream of the facultative oxidation zone, for nitrifying the side stream at least partially, with denitrification thereof thereafter taking place in the anaerobic reaction zone.

6. A wastewater treatment process according to claim 4, which includes passing effluent wastewater from the aerobic reaction zone through a clarification zone where biological sludge in suspension is separated from the treated wastewater, with the underflow from the clarification zone being recycled as a sludge stream to the anaerobic reaction zone.

7. A wastewater treatment process according to claim 6, wherein a recycle stream is withdrawn from the aerobic reaction zone effluent upstream of the clarification zone, and recycled back to the wastewater stream entering the aerobic reaction zone to obtain some denitrification thereof and a concomittant recovery of alkalinity.

8. A wastewater treatment process according to claim 4, which includes recycling a portion of the side stream from the facultative oxidation pond, upstream of the anaerobic reaction zone, back to the side stream upstream of the pond or directly into the pond.

9. A wastewater treatment process according to claim 4, which includes passing a portion of the side stream directly to the aerobic reaction zone, with only a portion thereof thus being returned to the anaerobic reaction zone.

10. A wastewater treatment process according to claim 9, wherein the portion of the side stream which is passed directly to the aerobic reaction zone, is withdrawn at a point after the side stream has been subjected to at least some biological oxidation.

11. A wastewater treatment process according to claim 9, wherein the portion of the side stream which passes directly to the aerobic reaction zone enters the wastewater stream from the anaerobic reaction zone downstream of the point at which the side stream is withdrawn therefrom.

12. A wastewater treatment process according to claim 1, wherein the wastewater from the anaerobic reaction zone passes through a facultative oxidation zone prior to entering the aerobic reaction zone, with the side stream being withdrawn downstream of this facultative oxidation zone.

13. A wastewater treatment process, which comprises
passing wastewater through an anaerobic reaction zone so that organic matter in the wastewater is subjected to anaerobic biological degradation;
passing wastewater from the anaerobic reaction zone through an aerobic reaction zone in which organic matter in the wastewater is subjected to aerobic biochemical breakdown;
withdrawing a wastewater side stream downstream of the anaerobic reaction zone and upstream of the aerobic reaction zone;
passing the side stream through a facultative oxidation zone wherein organic matter therein is subjected to aerobic biochemical breakdown;
passing at least a portion of the side stream directly to the aerobic reaction zone; and optionally, returning a portion of the side stream to the anaerobic reaction zone.

14. A wastewater treatment process which comprises passing wastewater through an anaerobic reaction zone so that organic matter in the wastewater is subjected to anaerobic biological degradation;

passing the wastewater from the anaerobic reaction zone through a first facultative oxidation zone wherein organic matter therein is partially subjected to aerobic biochemical breakdown;

passing the wastewater from the first facultative oxidation zone to an aerobic reaction zone in which the organic matter present therein is subjected to further aerobic biochemical breakdown;

withdrawing a wastewater side stream downstream of the first facultative oxidation zone and upstream of the aerobic reaction zone;

passing the side stream through a second facultative oxidation zone; and returning at least a portion of the side stream to the anaerobic reaction zone.

* * * * *

UNITED STATES PATENT AND TRADEMARK OFFICE
CERTIFICATE OF CORRECTION

PATENT NO. : 5,246,585
DATED : September 21, 1993
INVENTOR(S) : Pieter G. J. Meiring It is certified that error appears in the above-indentified patent and that said Letters Patent is hereby corrected as shown below:

Column 5, line 65, "$\leqq$" should be --$\leq$--.

Column 7, line 28, "$\underset{=}{<}$" should be --$\leq$--.

Signed and Sealed this

Fifth Day of July, 1994

Attest:

BRUCE LEHMAN

*Attesting Officer*   *Commissioner of Patents and Trademarks*